United States Patent
Lee

(10) Patent No.: US 7,499,069 B2
(45) Date of Patent: Mar. 3, 2009

(54) LIGHT SCANNING DEVICE AND METHOD THEREOF

(75) Inventor: Jong-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 11/342,646

(22) Filed: Jan. 31, 2006

(65) Prior Publication Data

US 2007/0013764 A1    Jan. 18, 2007

(30) Foreign Application Priority Data

Jul. 13, 2005    (KR)    .................. 10-2005-0063286

(51) Int. Cl.
*B41J 2/435*    (2006.01)
*H03M 1/00*    (2006.01)
*G11C 27/02*    (2006.01)

(52) U.S. Cl. .................... 347/224; 341/122; 327/91

(58) Field of Classification Search ................ 347/224; 327/91; 341/122
See application file for complete search history.

(56) References Cited

U.S. PATENT DOCUMENTS

| | | | | |
|---|---|---|---|---|
| 4,389,659 A | * | 6/1983 | Sprague | 347/136 |
| 5,347,298 A | * | 9/1994 | Gokita | 347/133 |
| 5,978,003 A | * | 11/1999 | Brenner, Jr. | 347/116 |
| 6,566,641 B1 | * | 5/2003 | Suda | 250/205 |
| 2003/0227841 A1 | * | 12/2003 | Tateishi et al. | 369/44.34 |
| 2005/0083828 A1 | * | 4/2005 | Chen | 369/116 |

FOREIGN PATENT DOCUMENTS

| | | |
|---|---|---|
| JP | 06-047952 | 2/1994 |
| JP | 08-187893 | 7/1996 |
| JP | 11-058822 | 3/1999 |
| JP | 11-105335 | 4/1999 |
| JP | 2003-039724 | 2/2003 |
| JP | 2004-101656 | 4/2004 |
| JP | 2004-216836 | 8/2004 |

* cited by examiner

*Primary Examiner*—Stephen D Meier
*Assistant Examiner*—Sarah Al-Hashimi
(74) *Attorney, Agent, or Firm*—Roylance, Abrams, Berdo & Goodman, L.L.P.

(57) ABSTRACT

A light scanning device and a method thereof are provided. The device is under control of a controller for controlling an image-forming apparatus and includes a second S&H signal generator, light output part, and a light output controller. The second S&H signal generator generates a plurality of second S&H signals, each consisting of a sampling interval and a holding interval and generated using a first S&H signal provided from the controller. The light output part outputs a plurality of lights and the light output controller controls the light output part to generate the plurality of lights for the respective sampling intervals of the plurality of second S&H signals and sets a control signal value controlling intensities of lights to be maintained for the holding intervals of the plurality of second S&H signals on the basis of the intensities of the generated light. Accordingly, standardization of an interface between parts is simplified.

17 Claims, 4 Drawing Sheets

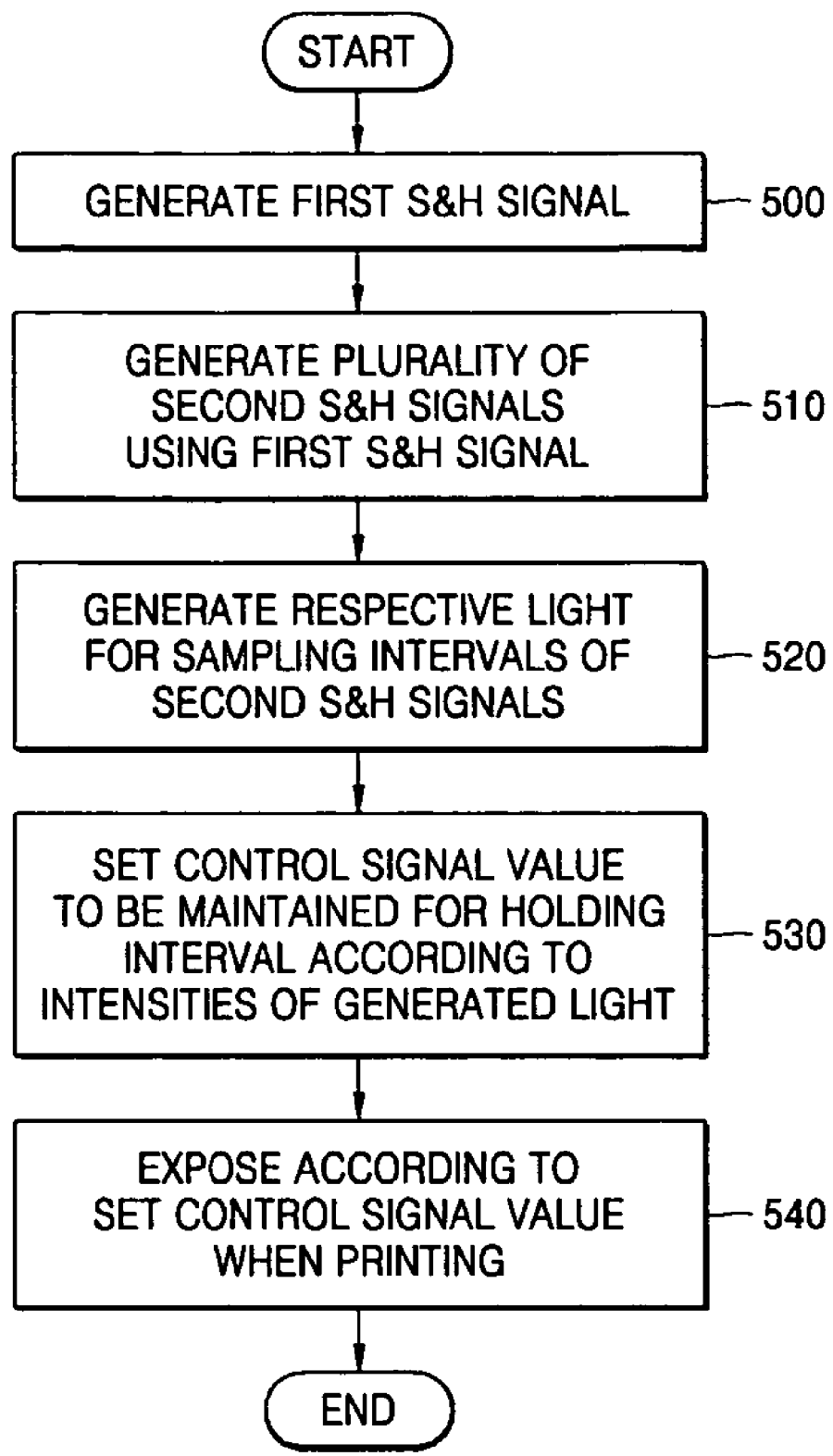

LIGHT SCANNING DEVICE AND METHOD THEREOF

CROSS-REFERENCE TO RELATED PATENT APPLICATION

This application claims the benefit under 35 U.S.C. § 119(a) of Korean Patent Application No. 10-2005-0063286, filed on Jul. 13, 2005, in the Korean Intellectual Property Office, the entire disclosure of which is hereby incorporated by reference.

BACKGROUND OF THE INVENTION

1. Field of the Invention

The present invention relates to a light scanning device and a method thereof. More particularly, the present invention relates to a light scanning device and a method thereof capable of standardizing an interface by simplifying control signals inputted to the light scanning device and reducing the size of a connector for signal connection in an apparatus including the light scanning device, such as a printer or multifunction machine, using a laser beam.

2. Description of the Related Art

An electrophotographic image-forming apparatus performs a printing operation in the following way. First, a light scanning device scans light, corresponding to inputted image data, onto the surface of a photosensitive drum uniformly charged to a voltage. An electrostatic latent image is formed on the surface of the photosensitive drum and when toner is supplied on the surface of the photosensitive drum, a toner image is formed on the electrostatic latent image.

A transfer roller then transfers the toner image formed on the photosensitive drum onto a recording paper. Next, the toner image transferred to the recording paper is fixed onto the recording paper by high heat and pressure of a fixer and then discharged from the image-forming apparatus.

FIG. 1 is a block diagram of a light scanning device included in a general image-forming apparatus. The light scanning device includes a light output controller 100 and a light output part 110. The light output controller 100 receives four sample and hold (referred to as S&H hereinafter) signals IN1, IN2, IN3, and IN4 from a controller (not shown). In this case, the controller is acting as a S&H signal generator. Since the light scanning device of FIG. 1 generates four lights, it is called a quad beam scanning device.

The light output part 110, generally called a quad beam semiconductor laser, includes four light-generating parts 120, 122, 124, and 126 generating respective lights and a light-output amount sensor 128. The light-generating parts 120 through 126 are generally realized by laser diodes and the light-output amount sensor 128 is realized by a photodiode. Since the laser diodes have a characteristic in that their light output changes depending on environmental conditions, particularly temperature, a photodiode monitoring the light output is required.

FIG. 2 is a waveform diagram illustrating four S&H signals IN1, IN2, IN3, and IN4 provided to the light scanning device of FIG. 1. Here, a gray-colored region marked by 'S' is a sampling interval and the region marked by 'H' is a holding interval.

The light output controller 100, generally called an automatic power controller (APC) circuit, controls the light output part 110 to maintain a constant light output. The light output controller 100 is generally realized by a driver integrated circuit (IC).

For sequential sampling intervals of the four S&H signals IN1, IN2, IN3, and IN4 having the waveforms of FIG. 2 inputted from the controller, the light output controller 100 generates light by having an electrical current flow through the respective laser diodes 120, 122, 124, and 126. Next, the light output controller 100 receives a voltage from the photodiode 128 reacting to the generated light. Using the voltage, the light output controller 100 sets a control signal value to be maintained for the holding intervals of the S&H signals IN1, IN2, IN3, and IN4. The control signal value is an electrical current value associated with an amount of electrical current flowing through the laser diodes 120, 122, 124, and 126. That is, it is possible to suppress fluctuations in a light output due to temperature by setting a current that reflects the respective light-output amounts monitored by the photodiode 128. In the case where the light output controller 100 is realized by a driver IC-type APC circuit, a detailed operation thereof will be described below. When the laser diodes 120 through 126 initially emit light, a capacitor (not shown) connected with an external terminal of the APC circuit 100 is charged and discharged according to a difference between a reference voltage and a feedback voltage output from the photodiode 128, so that light output is maintained at a constant intensity. The above operation is performed for the sampling intervals of the S&H signals IN1, IN2, IN3, and IN4. Since the capacitor is in a high impedance state for the holding intervals, the capacitor does not perform a light-output control function for the holding intervals.

Since only one photodiode 128 for the four laser diodes 120 through 126 is provided, times at which the respective laser diodes 120 through 126 generate light are differentiated in order to individually obtain feedback voltages from the photodiode 128 that correspond to light generated by the respective laser diodes 120 through 126. For that purpose, four S&H signals IN1, IN2, IN3, and IN4, such as the waveforms in FIG. 2, are generally provided.

Since the conventional quad beam scanning device requires four S&H signal inputs as described above, it is difficult to set a margin for an input control time. Also, since the related art quad beam scanning device requires a plurality of input signals, it is difficult to standardize an interface and it is difficult to make a small connector for signal connection. As such, a compact apparatus is difficult to realize.

Accordingly, there is a need for an improved light scanning device and a method thereof that allows for an interface to be easily standardized and for a reduced size signal connector.

SUMMARY OF THE INVENTION

An aspect of the present invention is to address at least the above problems and/or disadvantages and to provide at least the advantages described below. Accordingly, an aspect of the present invention is to provide a light scanning device and a method thereof capable of allowing for the standardization of an interface by simplifying control signals inputted to the light scanning device and making a more compact structure possible by reducing the size of the signal connector used in the light scanning device for generating a plurality of lights and included in an image-forming apparatus such as a printer or multifunction machine.

According to an aspect of an exemplary embodiment of the present invention, there is provided a light scanning device under control of a controller for controlling an image-forming apparatus, the controller comprising a first S&H (sample and hold) signal generator generating a first S&H signal, the device comprising a second S&H signal generator for generating a plurality of second S&H signals from a first S&H signal provided from the controller, each of the plurality of second S&H signals comprising a sampling interval and a holding interval. The light scanning device further comprising a light output part for outputting a plurality of respective lights and a light output controller for controlling the light output part to output the plurality of respective lights for respective sampling intervals of the plurality of second S&H signals and for setting a control signal value controlling intensities of the plurality of respective lights maintained for holding intervals of the plurality of second S&H signals on the basis of the intensities of the outputted plurality of respective lights.

The light output part may include a plurality of light generators for generating and outputting the respective lights under control of the light output controller. Further, the light output part may include a light-output amount sensor for sensing intensities of the respective lights generated for the sampling intervals and for providing the sensed intensities to the light output controller under control of the light output controller.

The second S&H signal generator may delay the first S&H signal for one or more respective periods of time to generate the plurality of second S&H signals.

According to another aspect of an exemplary embodiment of the present invention, there is provided a light scanning method that includes generating a first S&H signal comprising a sampling interval and a holding interval. The method further includes generating a plurality of second S&H signals using the generated first S&H signal, each of the plurality of second S&H signals comprising a sampling interval and a holding interval. Moreover, the method includes generating respective lights for respective sampling intervals of the generated plurality of second S&H signals and sensing intensities of the generated respective lights and setting a control signal value controlling the intensities of the respective lights to be maintained for respective holding intervals of the plurality of second S&H signals.

The generating of the plurality of second S&H signals may include delaying the first S&H signal for one or more respective periods of time to generate the plurality of second S&H signals.

According to yet another aspect of an exemplary embodiment of the present invention, there is provided a computer-readable recording medium storing at least one computer program controlling a light scanning device, the recording medium storing a computer program including generating a first S&H signal comprising a sampling interval and a holding interval. The computer program further includes generating a plurality of second S&H signals using the generated first S&H signal, each of the plurality of second S&H signals comprising a sampling interval and a holding interval. Moreoever, the computer program includes generating respective light signals for respective intervals of the generated plurality of second S&H signals, the generated respective light signals being used for generating respective lights. Furthermore, the computer program includes sensing intensities of the generated respective lights and setting a control signal value controlling intensities of the respective lights to be maintained for respective holding intervals of the plurality of second S&H signals.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain embodiments of the present invention will be more apparent from the following description taken in conjunction with the accompanying drawings, in which:

FIG. 5 is a flowchart of operations of a light scanning device and a method thereof according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Exemplary embodiments of the present invention will now be described with reference to the accompanying drawings.

Figure 1:
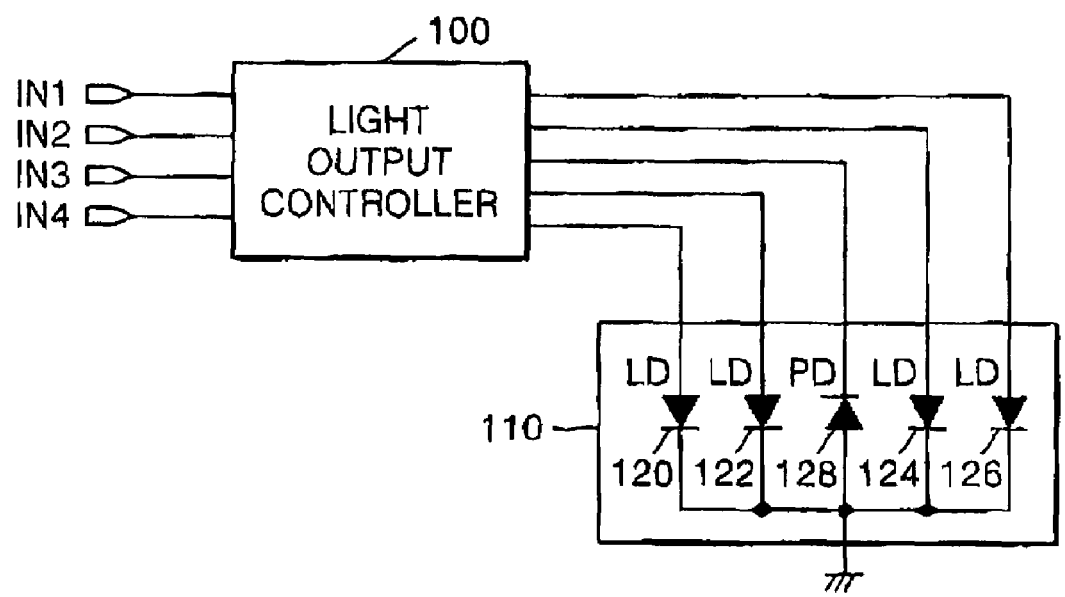
FIG. 1 is a block diagram of a light scanning device included in a conventional image-forming apparatus.
Figure 2:
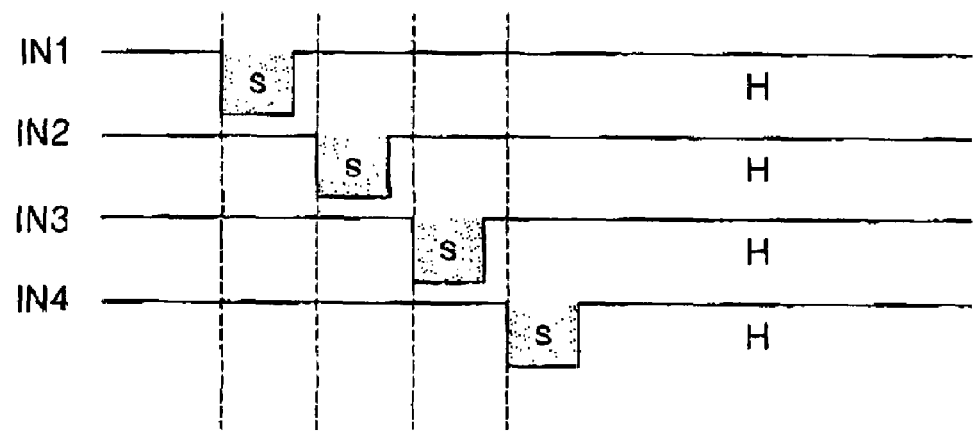
FIG. 2 is a waveform diagram illustrating S&H signals inputted to a quad beam light scanning device.
Figure 3:
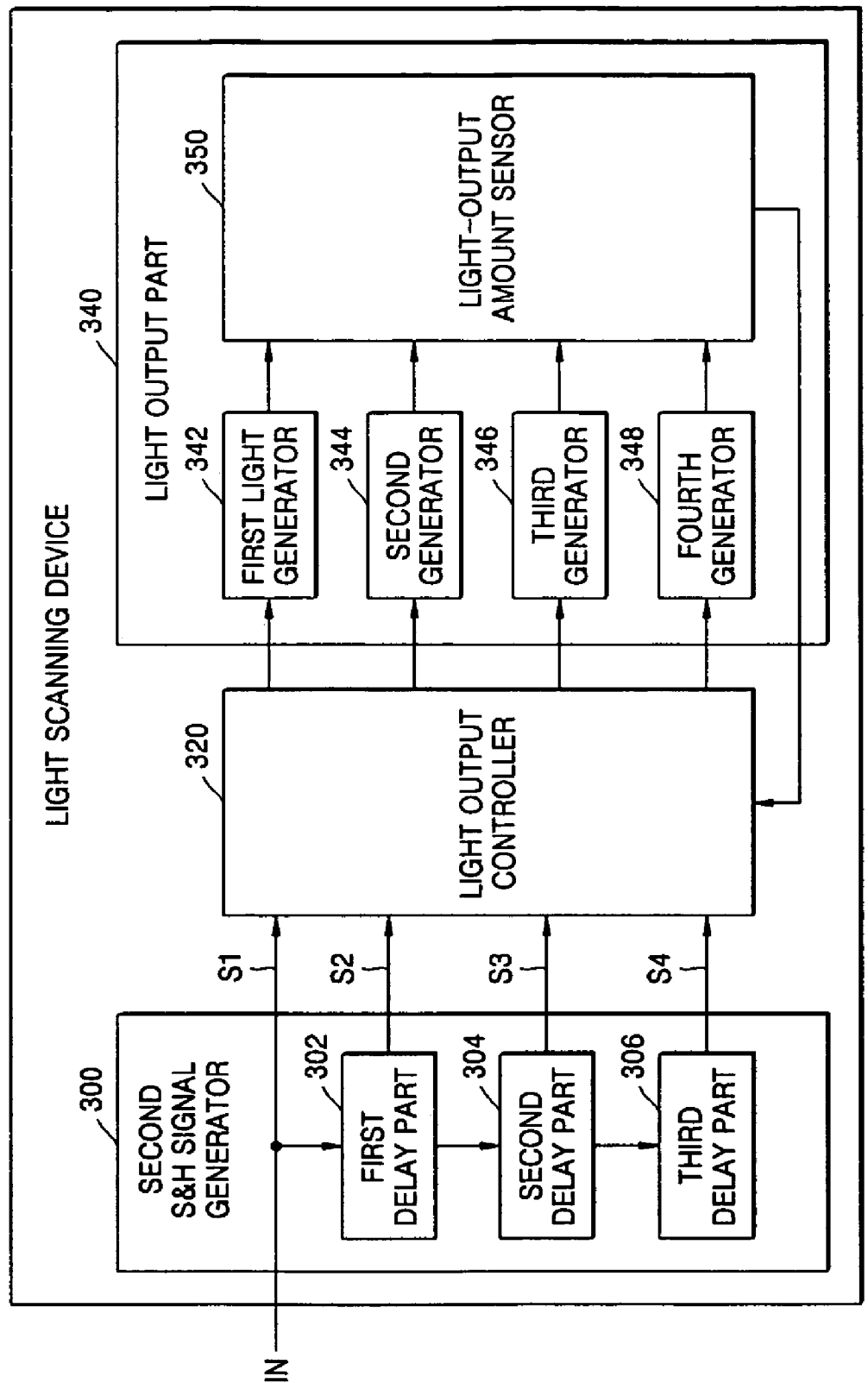
FIG. 3 is a block diagram of a light scanning device according to an exemplary embodiment of the present invention.

FIG. 3 is a block diagram of a light scanning device according to an exemplary embodiment of the present invention. The light scanning device includes the second S&H signal generator 300, a light output controller 320, and a light output part 340.

The second S&H signal generator 300 receives a first S&H signal IN, comprising a sampling interval and a holding interval, from a first S&H signal generator (not shown). A controller (not shown) controlling an image-forming apparatus may comprise the first S&H signal generator. The second S&H signal generator 300 generates the plurality of second S&H signals S1, S2, S3, and S4 using the first S&H signal IN. By way of example, the light output part 340 may be a quad beam laser semiconductor and the plurality may be four. However, the light output part 340 may comprise a device using any number of beams and the plurality may be any number.

The second S&H signal generator 300 sequentially delays the first S&H signal IN provided from the first S&H signal generator for one or more respective periods of time to generate the plurality of second S&H signals S1, S2, S3, and S4. Here, the respective periods of time may be set to prevent the sampling periods of the plurality of second S&H signals S1, S2, S3, and S4 from overlapping one another.

To delay the respective period of time, delay parts 302, 304, and 306 delaying a signal may be provided. The delay parts 302, 304, and 306 may be flip-flops, timer coils, or buffers. As illustrated in FIG. 3, three signals in addition to the first S&H signal IN comprise the plurality of second S&H signals S1, S2, S3, and S4 that are used as the four signals to obtain sampling intervals for the four light outputs. In the exemplary embodiment, to generate the three additional signals the second S&H signal generator 300 is shown to include three delay parts, however a different number of delay parts may be used.

The light output part 340 includes four light generators 342, 344, 346, and 348 generating and outputting respective light under control of the light output controller 320 and a light-output amount sensor 350.

The light generators 342, 344, 346, and 348 may be laser diodes but are not limited to the laser diodes as other light generating devices may be used.

The light-output amount sensor 350 senses intensities of the respective lights generated according to the sampling intervals and provides the sensed intensities to the light output controller 320 under control of the light output controller 320. The light-output amount sensor 350 may be a photodiode that reacts to the generated light and outputs a voltage to the light output controller 320 according to the intensity of the sensed light.

The light output controller 320 controls the light output part 340 to generate the plurality of lights for the sampling intervals of the second S&H signals S1, S2, S3, and S4 on the basis of the intensity of the sensed generated light. Also, light output controller 320 sets a control signal value controlling intensities of the light to be maintained for the holding intervals of the second S&H signals S1, S2, S3, and S4 on the basis of the intensities of the sensed generated light. The control signal value may be a current value flowing through the plurality of laser diodes or a voltage value applied to the plurality of laser diodes.

Figure 4A:
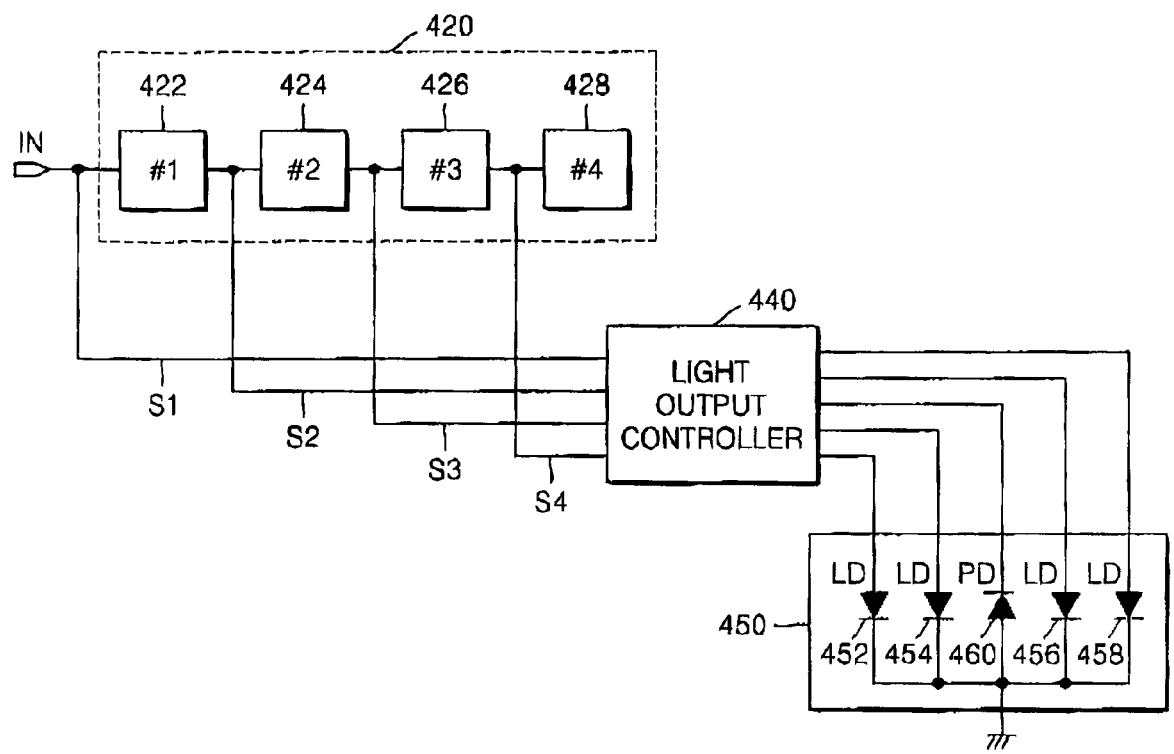
FIGS. 4A and 4B are a circuit diagram of a light scanning device according to an exemplary embodiment of the present invention and a waveform diagram of the second S&H signal, respectively.
Figure 4B:
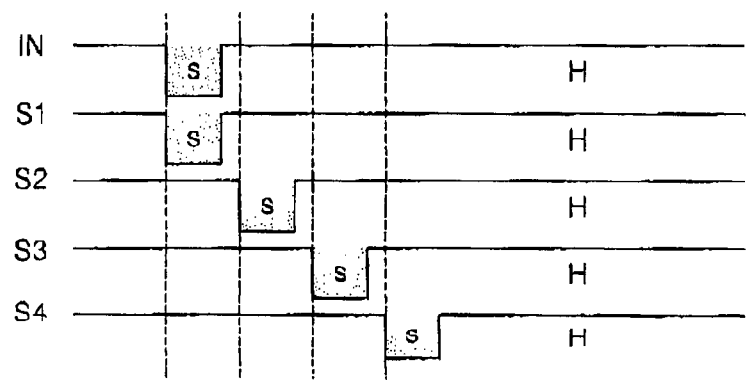

FIGS. 4A and 4B are a circuit diagram of a light scanning device according to an exemplary embodiment of the present invention and a waveform diagram of the second S&H signals, respectively.

Second four S&H signals S1, S2, S3, and S4 are generated by the second S&H signal generator 420 that receives the first one (not four) S&H signal IN from a first S&H signal generator and includes four delay parts 422, 424, 426, and 428 in the form of a D flip-flop. The generated second S&H signals S1, S2, S3, and S4 are provided to a light output controller 440 such as an APC circuit. In FIGS. 4A and 4B, second S&H signal S1 has no time delay with respect to the first S&H signal IN.

The light output controller 440 controls the respective light generators 452, 454, 456, and 458 located in a light output part 450 to sequentially generate light for sampling intervals using the second S&H signals S1, S2, S3, and S4. Also, light output controller 440 receives a voltage value from a photodiode 460 to set a control signal value to be maintained for the holding intervals. Here, a method of setting the control signal value is the same as that in the related art.

FIG. 5 is a flowchart of operations of a light scanning device and a method thereof according to an exemplary embodiment of the present invention.

First, a first S&H signal IN, consisting of the sampling interval and the holding interval, is generated by a first S&H signal generator and is provided to a light scanning device used with an image-forming apparatus (operation 500).

A plurality of second S&H signals S1, S2, S3, and S4 are generated from the generated first S&H signal by a second S&H signal generator 300 (operation 510). Here, the first S&H signal may be delayed for one or more respective times in order to generate a plurality of second S&H signals S1, S2, S3, and S4. The respective times may be set so that the sampling intervals of the plurality of second S&H signals S1, S2, S3, and S4 don't overlap one another, as illustrate in the waveform of FIG. 4B.

The light output controller 320 controls the light generators 342, 344, 346, and 348 to each generate light in accordance with the sampling intervals of the respective generated second S&H signals (operation 520). Here, the light may be generated by the laser diodes as described above.

The intensities of the generated light are sensed by light-output amount sensor 350 and the sensed results are provided to the light output controller 320. The light output controller 320 sets a control signal value controlling the intensities of light to be maintained for the respective holding intervals of the second S&H signals using the sensed results (operation 530). If the light generators 342, 344, 346, and 348 comprise laser diodes, the control signal value may be a current value flowing through, or a voltage value applied to, the plurality of laser diodes.

The sampling intervals are intervals required in an initialization process of a printing process. In an actual printing process, light is output according to the set control signal value, so that a light-exposing process is performed (operation 540).

Exemplary embodiments of the invention can also be embodied as computer-readable codes on a computer-readable recording medium. The computer-readable recording medium is any data storage device that can store data which can thereafter be read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the exemplary embodiments of present invention can be easily construed by programmers skilled in the art to which the present invention pertains.

Exemplary embodiments of the present invention allow for the standardization of an interface between parts within an image-forming apparatus by simplifying a plurality of control signals inputted to a quad beam scanning device used with the image-forming apparatus. Also, exemplary embodiments of the present invention can realize a more compact quad beam scanning device by reducing the size of the signal connector. Exemplary embodiments of the present invention are more effectively applied to a scanning device that generates numerous beams.

While the invention has been shown and described with reference to certain embodiments thereof, it will be understood by those skilled in the art that various changes in form and details may be made therein without departing from the spirit and scope of the invention as defined by the appended claims.

What is claimed is:

1. A light scanning device under control of a controller for controlling an image-forming apparatus, the controller comprising a first S&H (sample and hold) signal generator generating a first S&H signal inputted to the light scanning device, the device comprising:

a second S&H signal generator for generating a plurality of second S&H signals from the first S&H signal, each of the plurality of second S&H signals comprising a sampling interval and a holding interval;

a light output part for outputting a plurality of respective lights; and a light output controller for controlling the light output part to output the plurality of respective lights for respective sampling intervals of the plurality of second S&H signals and for setting a control signal value controlling intensities of the plurality of respective lights maintained for holding intervals of the plurality of second S&H signals on the basis of the intensities of the outputted plurality of respective lights.

2. A light scanning device under control of a controller for controlling an image-forming apparatus, the controller comprising a first S&H (sample and hold) signal generator generating a first S&H signal, the device comprising:

a second S&H signal generator for generating a plurality of second S&H signals from the first S&H signal, each of the plurality of second S&H signals comprising a sampling interval and a holding interval;

a light output part for outputting a plurality of respective lights; and a light output controller for controlling the light output part to output the plurality of respective lights for respective sampling intervals of the plurality of second S&H signals and for setting a control signal value controlling intensities of the plurality of respective lights maintained for holding intervals of the plurality of second S&H signals on the basis of the intensities of the outputted plurality of respective lights;

wherein the light output part comprises:

a plurality of light generators for generating and outputting the respective lights under control of the light output controller; and a light-output amount sensor for sensing intensities of the respective lights generated for the sampling intervals and for providing the sensed intensities to the light output controller under control of the light output controller.

3. The device of claim 2, wherein the plurality of light generators comprise four light generators.

4. The device of claim 2, wherein the plurality of light generators comprise one or more laser diodes.

5. The device of claim 4, wherein the control signal value is a current value associated with the amount of electrical current flowing through the plurality of laser diodes or a voltage value associated with the amount of electrical voltage applied to the plurality of laser diodes.

6. The device of claim 2, wherein the light-output amount sensor comprises a photodiode for reacting to the respective outputted plurality of lights.

7. The device of claim 6, wherein the light-output amount sensor senses a voltage generated by the photodiode and provides the sensed result to the light output controller.

8. A light scanning device under control of a controller for controlling an image-forming apparatus, the controller comprising a first S&H (sample and hold) signal generator generating a first S&H signal, the device comprising:

a second S&H signal generator for generating a plurality of second S&H signals from the first S&H signal, each of the plurality of second S&H signals comprising a sampling interval and a holding interval;

a light output part for outputting a plurality of respective lights; and a light output controller for controlling the light output part to output the plurality of respective lights for respective sampling intervals of the plurality of second S&H signals and for setting a control signal value controlling intensities of the plurality of respective lights maintained for holding intervals of the plurality of second S&H signals on the basis of the intensities of the outputted plurality of respective lights;

wherein the second S&H signal generator delays the first S&H signal for one or more respective periods of time to generate the plurality of second S&H signals.

9. The device of claim 8, wherein the one or more respective periods of time are delay times set to prevent the sampling intervals of the plurality of second S&H signals from overlapping one another.

10. The device of claim 8, wherein the second S&H generator comprises a second plurality of delay parts for delaying a signal.

11. The device of claim 10, wherein the second plurality of delay parts comprises one of a flip-flop, a timer coil, and a buffer.

12. A light scanning method comprising:

generating a first S&H signal comprising a sampling interval and a holding interval;

generating a plurality of second S&H signals using the generated first S&H signal, each of the plurality of second S&H signals comprising a sampling interval and a holding interval;

generating respective lights for respective sampling intervals of the generated plurality of second S&H signals; and sensing intensities of the generated respective lights and setting a control signal value controlling the intensities of the respective lights to be maintained for respective holding intervals of the plurality of second S&H signals.

13. The method of claim 12, wherein the generating of the respective lights comprises:

generating lights using one or more laser diodes.

14. A light scanning method comprising:

generating a first S&H signal comprising a sampling interval and a holding interval;

generating a plurality of second S&H signals using the generated first S&H signal, each of the plurality of second S&H signals comprising a sampling interval and a holding interval;

generating respective lights for respective sampling intervals of the generated plurality of second S&H signals; and sensing intensities of the generated respective lights and setting a control signal value controlling the intensities of the respective lights to be maintained for respective holding intervals of the plurality of second S&H signals;

wherein the generating of the plurality of second S&H signals comprises:

delaying the first S&H signal for one or more respective periods of time to generate the plurality of second S&H signals.

15. The method of claim 14, wherein the respective one or more periods of time are delay times set to prevent the sampling periods of the plurality of second S&H signals from overlapping one another.

16. A light scanning method comprising:

generating a first S&H signal comprising a sampling interval and a holding interval;

generating a plurality of second S&H signals using the generated first S&H signal, each of the plurality of second S&H signals comprising a sampling interval and a holding interval;

generating respective lights for respective sampling intervals of the generated plurality of second S&H signals; and sensing intensities of the generated respective lights and setting a control signal value controlling the intensities of the respective lights to be maintained for respective holding intervals of the plurality of second S&H signals;

wherein the generating of the respective lights comprises:

generating lights using one or more laser diodes; and wherein the control signal value controlling the intensities of the lights is a current value associated with the amount of electrical current flowing through the one or more laser diodes or a voltage value associated with the amount of electrical voltage applied to the one or more laser diodes.

17. A computer-readable recording medium storing at least one computer program controlling a light scanning device, the recording medium storing a computer program comprising:

generating a first S&H signal comprising a sampling interval and a holding interval;

generating a plurality of second S&H signals using the generated first S&H signal, each of the plurality of second S&H signals comprising a sampling interval and a holding interval;

generating respective light signals for respective intervals of the generated plurality of second S&H signals, the generated respective light signals being used for generating respective lights; and sensing intensities of the generated respective lights and setting a control signal value controlling intensities of the respective lights to be maintained for respective holding intervals of the plurality of second S&H signals.

* * * * *